April 4, 1967    R. L. MARTIN ETAL    3,312,207
CRANKCASE EMISSION CONTROL
Filed Feb. 11, 1965    3 Sheets-Sheet 1
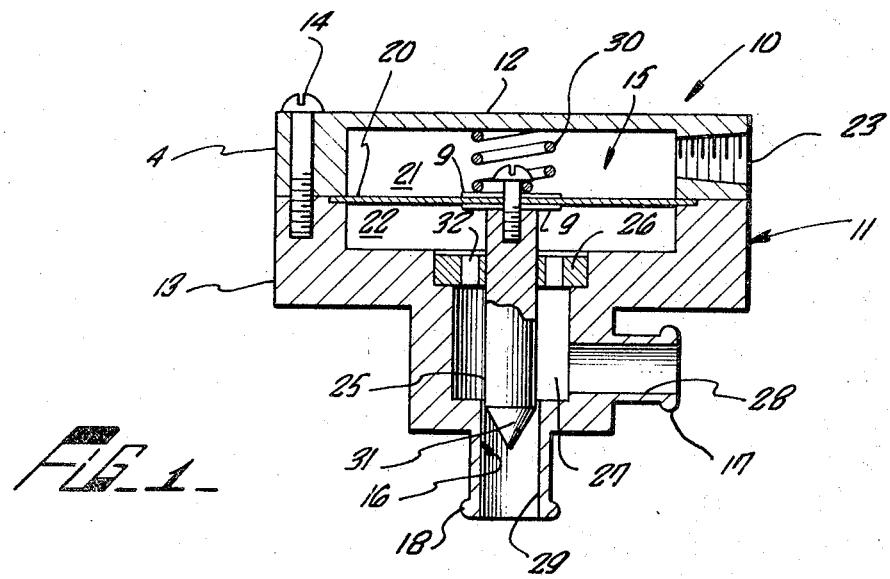
FIG_1_
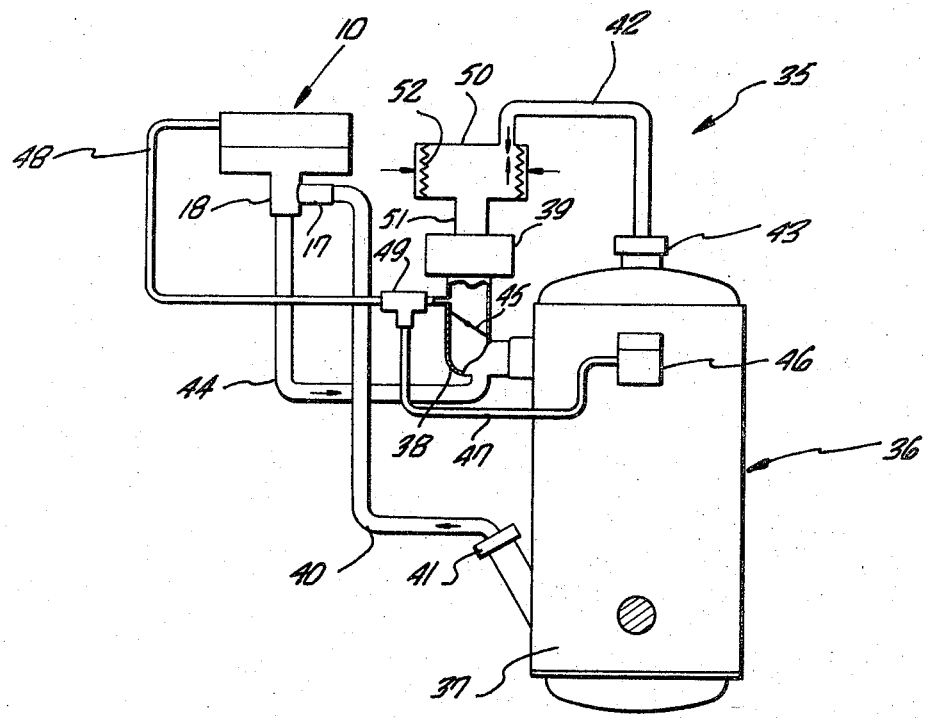
FIG_2_
INVENTORS
ROBERT L. MARTIN
ALBERT E. BREAUX
BY
ATTORNEYS

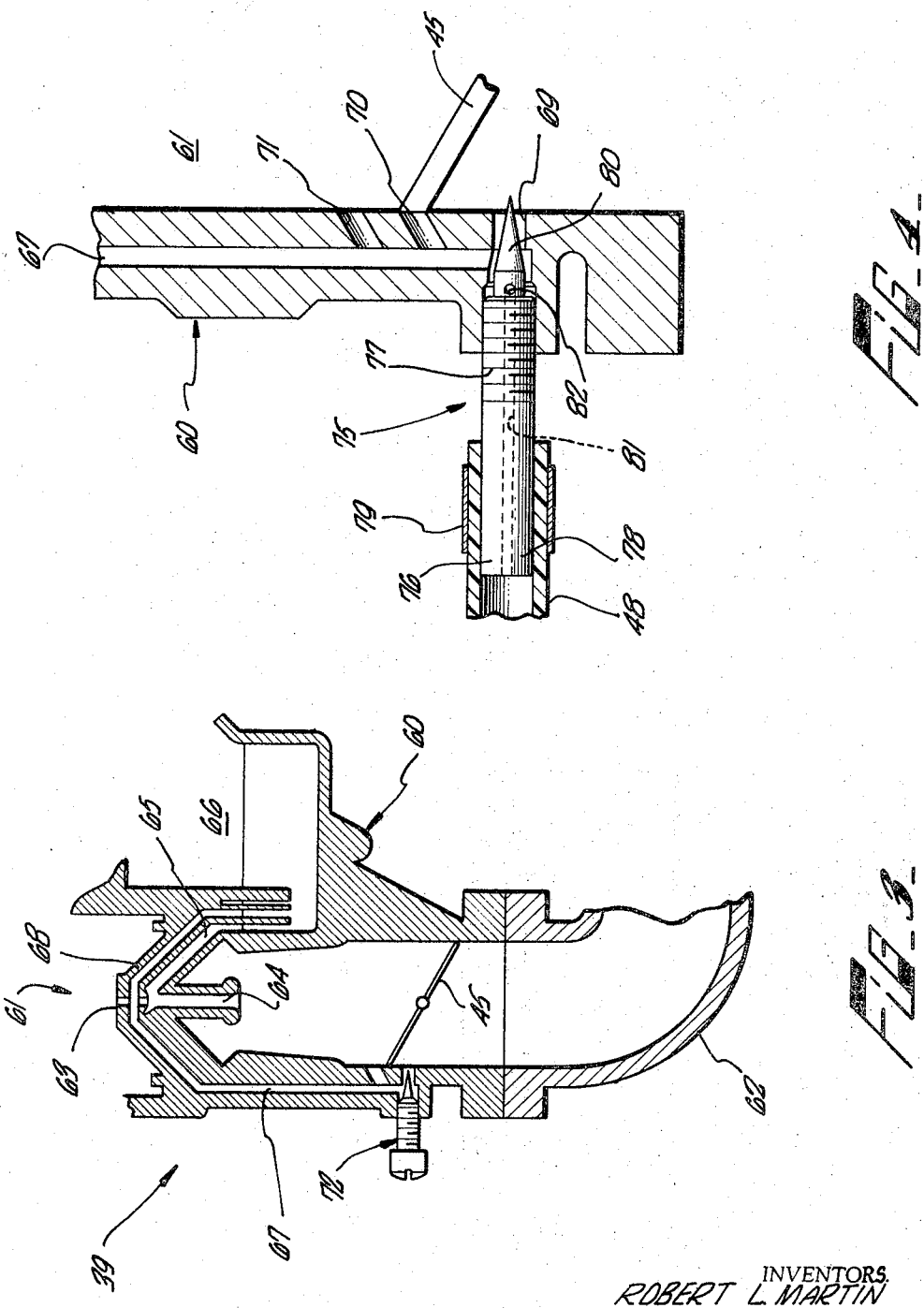

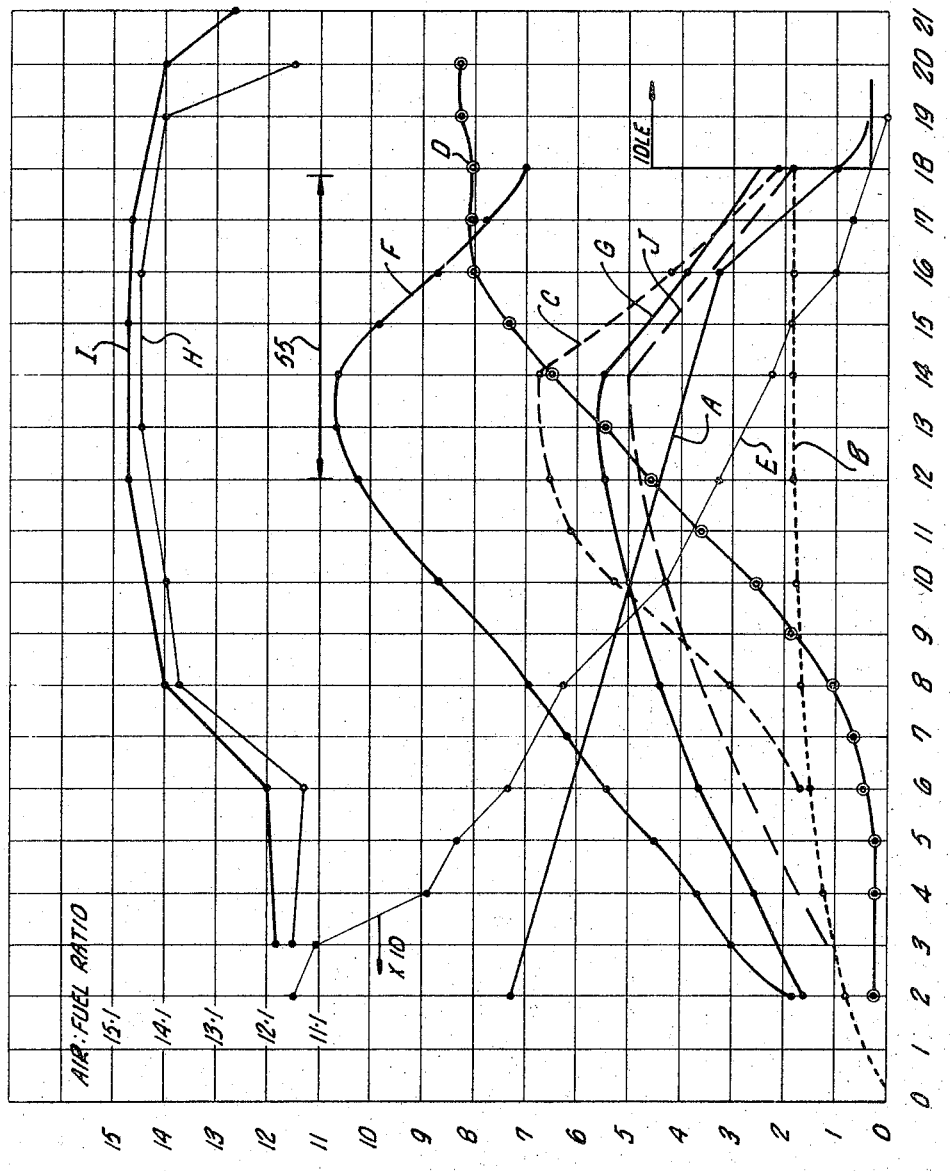

United States Patent Office 3,312,207
Patented Apr. 4, 1967

3,312,207
CRANKCASE EMISSION CONTROL
Robert L. Martin, Newhall, Calif., and Albert E. Breaux, 30095 Hasley Canyon Road, Saugus, Calif. 91350; said Martin assignor to said Breaux
Filed Feb. 11, 1965, Ser. No. 431,820
13 Claims. (Cl. 123—119)

This invention relates to internal combustion engines and more particularly to apparatus for controlling crankcase emissions in such engines to improve fuel utilization and to reduce air pollution.

In internal combustion engines a sliding fit is maintained between the pistons and cylinder walls. During the power stroke of the piston, extreme pressure differentials exist across the piston between the combustion chamber and the engine crankcase. These pressure differentials cause combustion products known as "blow-by gases" to be blown by the piston rings into the crankcase. Such blow-by gases must be vented from the crankcase to avoid the build-up in the crankcase of pressures which could blow out gaskets and shaft seals or damage the engine. Initially such vapors were vented to the atmosphere along with the vapors from oil in the crankcase. These vapors and the blow-by gases, collectively known as "crankcase emissions," are a source of air polution.

It has been learned that the crankcase emissions for Otto cycle internal combustion engines (the typical automobile engine) are involved in a photochemical reaction which produces ozone and other noxious and irritating gases. The contribution of crankcase emissions to smog is so significant that the State of California, for example, has required that new automobiles sold in the state be equipped with devices which introduce crankcase emissions into the intake manifold so that the emissions, composed principally of combustible vapors, are reburned in the engine before introduction into the atmosphere through the vehicle's exhaust system. Such devices are known as crankcase ventilation devices, blow-by devices, anti-smog devices, or crankcase emission control devices.

Previously known blow-by devices and systems have been concerned primarily with controlling crankcase emissions and have given only secondary consideration to engine performance. For this reason, existing blow-by devices and systems have not been accepted popularly. Some of the existing devices require frequent cleaning or adjustment, if the device and the engine are to perform properly and others are so constructed that their operation adversely affects engine performance. For example, some existing devices introduce a maximum quantity of crankcase emissions into the intake manifold as the engine is being started or is idling, thereby hindering engine starting and idling, and introduce a minimum quantity of crankcase emissions into the intake manifold when the throttle is full open. In other words, the effectiveness of some devices varies inversely with the production of blow-by vapors, and have been known, especially when operating imperfectly, to cause shaft seal damage, for example.

This invention provides a crankcase emission control device which is constructed to improve engine performance and also effectively control crankcase emissions. The device, and a system including the device, is simple, effective and inexpensive. It can be used on substantially any known internal combustion engine. It need not be adjusted at regular intervals and is self-cleaning. Moreover, it circulates crankcase emissisions into the intake manifold at a rate proportional to the production of such emissions, yet it does not adversely affect engine performance, as when the engine is started or sharply accelerated during the passing of another vehicle, for example.

Generally speaking, this invention provides a crankcase emission control device for an internal combustion engine which has a crankcase and intake manifold means, the latter including a throttle valve. The crankcase emission control device includes evacuating conduit means adapted to connect the crankcase to the intake manifold means posteriorly of the throttle valve, i.e., between the throttle valve and the engine proper. The device provides pressure operated control valve means in the evacuating conduit means for controlling the flow of vapor through the conduit means from the crankcase to the intake manifold means. The control valve means is movable between a first position which defines a discrete vapor flow area in the conduit means and a second position which defines a vapor flow area in the conduit means which is greater than the above-mentioned discrete area. The control valve means operates in response to a predetermined differential between the pressure in the intake manifold means anteriorly of the control valve, i.e., on the side of the throttle valve opposite from the engine proper, and the pressure in the crankcase.

FIG. 1 is a cross-sectional elevation view of a crankcase emission control device according to this invention;

FIG. 2 is a simplified view of one embodiment of a crankcase emission control system according to this invention;

FIG. 3 is a cross-sectional elevation view of a portion of a typical carburetor;

FIG. 4 is an enlarged cross-sectional elevation view of a portion of the structure shown in FIG. 3 as modified according to this invention; and FIG. 5 is a graph showing the relationships between intake manifold vacuum and several other conditions in a typical automobile engine equipped with the systems shown in FIGS. 2 and 4.

FIGURE 1 illustrates a presently preferred embodiment of a crankcase emission control device 10 according to this invention. The device has a housing 11 having an upper part 12 and a lower part 13 secured together as by screws 14, only one of which is shown. The housing is configured to define an interior chamber 15 and a passage 16 through the housing independent of the chamber. The housing also defines an inlet tube or hose fitting 17 and an outlet tube or hose fitting 18 which connect to the opposite ends of the passage, respectively. Fittings 17 and 18 are of different sizes, and cooperate with different sized hoses, to avoid any possibility that a mechanic may install the device improperly.

Diaphragm means such as flexible diaphragm 20 is mounted in the housing, preferably between the upper and lower parts of the housing as shown in FIG. 1, and is disposed across chamber 15 in such a manner that it divides the chamber into an upper portion 21 and a lower portion 22. If desired the diaphragm means may be a bellows or a piston arrangement which divides the chamber 15 into the two portions. A port 23 communicates the upper portion of the chamber with the exterior of the housing. A cylindrical metering valve member 25 is connected to the diaphragm and extends from chamber 15 through a guide 26 which slidably journals the valve member and is mounted inside the housing. The valve member extends from the guide into a cavity 27 which is formed in the housing and through which passage 16 passes. Preferably, as shown in FIG. 1, passage 16 has inlet and outlet portions 28 and 29, respectively, which connect with cavity 27 at right angles to each other. Passage outlet portion 29 is aligned with the axis of the valve member and has a diameter a predetermined amount greater than the diameter of the valve member. Preferably the diameter of passage portion 29, at least adjacent cavity 27, is 0.015 inch greater in diameter than the valve member, and the valve member has a diameter of 0.370 inch.

A spring 30 is disposed in chamber 25 and is connected between the diaphragm and the housing for biasing the valve member into passage portion 29. Preferably the spring is a compression spring disposed in the upper portion of the chamber and is such that the diaphragm will not be deflected to move the valve member out of passage portion 29 until the pressure differential across the diaphragm tending to compress the spring corresponds to about 40 inches of water.

The valve member has a control end 31 which defines a conically tapering point. The normal or at rest position of the valve member relative to passage portion 29 (see FIG. 1) is such that the base of the cone is spaced along the passage a predetermined distance from the opening of passage portion 29 to cavity 27.

A plurality of apertures 32 are formed through guide 26 so that cavity 27 and portion 22 of chamber 15 are in communication with each other and both are at essentially the same pressure.

FIGURE 2 illustrates one configuration a crankcase emission control system according to this invention may take. System 35 includes an internal combustion engine 36 which has a crankcase 37 and an intake manifold 38 which is connected to a carburetor 39. It is within the crankcase that the previously mentioned blow-by gases and oil vapors collect. In order that these vapors and gases not be discharged into the atmosphere, the crankcase is sealed except for a duct 40 which is connected between the crankcase oil filler cap 41 and the passage inlet fitting 17 of a device 10 according to the foregoing description, and except for a duct 42 connected to the crankcase through a crankcase air vent cap 43. The passage outlet fitting 18 of the device is connected by a duct 44 to the intake manifold posteriorly of a throttle valve 45, i.e., between the throttle valve and the engine proper. Strictly speaking, the throttle valve is a part of the carburetor as shown in FIG. 3; FIGURE 2 shows the throttle valve separate from the carburetor so that the illustration of system 35 may be simplified.

A distributor 46 is provided for engine 36 and includes a vacuum actuated spark advance mechanism. A duct 47 connects the vacuum inlet of the distributor spark advance mechanism with the intake manifold anteriorly, i.e., upstream, of the throttle valve. A duct 48 connects with duct 47, via a T-fitting 49 in duct 47, and extends into communication with chamber portion 21 in device 10 via port 23.

A radial-flow air cleaner 50 is mounted to an air intake 51 of the carburetor. The air cleaner includes a filter element 52, duct 42 from the crankcase air vent cap is connected to the air cleaner inwardly of the filter element so that any vapors introduced into the air cleaner via duct 42 are mixed with air which has already passed through the filter element.

When engine 36 is operated, a vacuum is produced in the intake manifold. This vacuum is relied upon to draw air through the air cleaner into the carburetor where fuel is mixed with the air, and to draw the air-fuel mixture into the combustion chambers of the engine. The throttle valve is operated to regulate the extent to which this vacuum is presented to the carburetor to control the rate at which air is drawn through the carburetor. When the engine is idling, the throttle valve essentially closes the gas-flow duct of the manifold from the carburetor with the result that a low vacuum is present in the manifold upstream of the throttle valve. As more power is desired, the throttle valve is opened so that more and more vacuum (see curve F in FIG. 5) is present in the manifold upstream of the throttle valve until the vacuum in this area reaches a maximum at which time the vacuum is the same on both sides of the throttle valve. (The vacuum in the intake manifold posteriorly of the throttle valve decreases as the throttle valve is opened, i.e., as the power developed by the engine increases.) Thereafter, assuming the throttle valve is kept full open, if additional loads are imposed on the engine, the vacuum in the intake manifold becomes lower and lower until it reaches a value of about 2 inches of mercury. Curve F in FIG. 5 represents the vacuum in the spark advance vacuum supply duct 47 and in duct 48. Curve D in FIG. 5 represents the variation spark advance as a function of intake manifold pressure; the value at any point on the spark advance curve is directly related to the power which the engine is required to produce. The relationships illustrated by the above-mentioned and the other curves of FIG. 5 are explained in the legend accompanying FIG. 5.

Range 55 in FIG. 5, associated with ccrve F but applicable to all the curves in FIG. 5, defines the major portion of the operating life of the engine in an automobile subjected to average use. The portion of the curves to the left of range 55 describe various parameters of engine performance when the engine is operated to deliver more power than is required when the engine is driving the automobile at its normal cruising speed, as when the automobile is accelerating from a standstill or is accelerating from its crusing speed to pass another automobile on the highway.

The curves shown in FIG. 5 represent the relationships of various phenomena which are associated with the operation of an automobile engine; the variations in these phenomena are plotted against the vacuum, in inches of mercury (Hg), in the intake manifold between the throttle valve and the cylinders of the engine. The data for the curves in FIG. 5 were obtained from a 1964 Chevrolet engine having a 409 cubic inch displacement, and equipped with a Rochester 4-barrel carburetor, operated on a dynamometer at speeds corresponding to 30 miles per hour. Curve A represents the rate at which an engine of this class, and falling in the tenth decile group, generates blow-by gases; the tenth decile group corresponds to the worst 10% of the engines tested by the State of California in a program conducted to determine the relationship between crankcase emissions and air pollution.

As mentioned above, crankcase emissions (composed principally of combustible blow-by gases) are drawn from the engine crankcase and introduced into the engine cylinders via the intake manifold so that the emissions can be burned before they are passed to the atmosphere through the exhaust system of the engine. The carburetor, however, is constructed so that it provides the air-fuel mixture which is proper for the engine at that particular moment; the addition of the crankcase emissions to the air-fuel mixture disturbs the desired relation of fuel to air. Device 10, however, is constructed so that the adverse effect of the crankcase emission upon the air-fuel mixture is minimized.

As noted above, engine crankcase 37 is connected with the intake manifold anteriorly of throttle valve 45 by way of ducts 40 and 44 (collectively referred to as a crankcase evacuating conduit) and passage 16 of device 10. There is a definite clearance between valve member 25 and passage portion 29 when the valve member is in its closed condition (the condition shown in FIG. 1). Accordingly, when the engine is idling, i.e., when there is very little generation of blow-by gases in the engine, a minimal amount of gas (air, blow-by gases, and oil vapors) are introduced into the intake manifold. Thus, the normally rich air-fuel mixture supplied to the engine is leaned only a nominal amount and the engine idles smoothly. Curve B shows the rate at which crankcase emissions are passed through the metering valve of device 10 when no vacuum control signal is applied to chamber 20. As the load on the engine is increased, as when the automobile is moving away from a stop-light, the throttle valve is opened and an increased vacuum is present in chamber portion 21 via duct 48 (see curve F). As the automobile accelerates gradually, more blow-by vapors are produced, and these vapors are introduced to the intake manifold in greater amounts as the pressure differential across diaphragm 20 increases; the pressure in chamber portion 22 is the same as the pressure in the crankcase (because the chamber is connected with the crankcase via apertures 32 and duct 40) and the pressure in the crankcase normally is at about atmospheric pressure. Thus, the diaphragm deflects in response to the variations in intake manifold vacuum anteriorly of the throttle valve, and this vacuum, at least through range 55 (see FIG. 5), is approximately proportional to, but in excess of, the rate at which blow-by gases are produced; during such operation of system 35 some air from air cleaner 50 is introduced into the crankcase via duct 42 to prevent the generation in the crankcase of a vacuum which would cause dirt to be drawn into the crankcase through the crankshaft seals, for example. Device 10, therefore, during the major portion of the operation of the engine, causes all the crankcase emissions to be removed from the crankcase via device 10 by intake manifold vacuum and to be passed to the engine where the combustible portions of the emissions are burned.

Because the communication between the crankcase and the intake manifold normally is varied in response only to the variations in the vacuum in the intake manifold anteriorly of the throttle valve, the lean air-fuel mixture supplied to the engine when it is necessary that the engine develop maximum power is further leaned only a nominal amount by device 10. This is true since, as seen from the left portion of curve F, the vacuum supplied to chamber portion 21 decreases as engine power increases beyond that normally required of the engine.

It will be observed from FIG. 5 that, because of the manner in which the spark advance control vacuum signal (curve F) varies with intake manifold vacuum, the rate at which gases are passed through device 10 (curve C) is reduced below the rate at which blow-by gases are produced (curve A) for high engine power requirements. When the engine is operated in this range, i.e., the range of engine performance corresponding to intake manifold vacuum lower than about 9.8 inches Hg, the portion of the crankcase emissions not introduced into the intake manifold via device 10 are introduced into the engine via duct 42, air cleaner 50 and carburetor 39. Those emissions which pass through duct 42 comprise a part of the air to which fuel is added to form the desired air-fuel mixture and thus do not adversely affect the performance of the engine.

As stated previously, the base of the cone defining the control end of valve member 25 is displaced along portion 29 of passage 16 from cavity 27. Accordingly, the minimum connection between the crankcase and the intake manifold is not altered until diaphragm 20 has deflected a predetermined amount. This feature is provided to assure that the rich air-fuel mixture supplied to the engine is not needlessly leaned when the engine operates in a manner bordering on idling, thereby preventing the engine from stalling. Thereafter, however, the communication between the crankcase and the intake manifold varies proportionally with variations in the vacuum applied to chamber portion 21 until a maximum valve opening is obtained. Such an opening characteristic for the valve provides effective control over crankcase emissions without undue adverse effect on the operation of the engine.

Curves H and I in FIG. 5 show an unexpected benefit from the use of system 35. Curve H represents the variation in air-fuel mixture with intake manifold vacuum in system 35 when device 10 has no control vacuum signal applied thereto, i.e., when the metering valve is kept in its "closed" condition. It would be expected that this curve would correspond to the best performance of engine 36. Curve I represents the variations in air-fuel mixture with intake manifold vacuum when duct 48 is coupled to housing 11 to present the spark advance vacuum control signal to chamber 15. As expected, a leaner air-fuel mixture results. It was found, however, that for a given value of intake manifold vacuum, curve I corresponds to a higher value of delivered horsepower (horsepower delivered to the wheels of the automobile) than the corresponding point of curve H. This means that the engine develops more power for a leaner air-fuel mixture and the engine is operated more economically.

Because valve member 25 in its "closed" condition defines a discrete gas flow area through passage 16, the valve is not subject to clogging as the device is used over a period of time. Crankcase emissions normally contain some vapors which are condensible and when condensed form a sludge which hardens to form a hard carbon deposit. The discrete flow area through the valve in its closed condition, however, assures that the crankcase emissions are kept moving, thereby minimizing the condensation of the condensible portions thereof and assuring that the valve is not clogged. This feature of the invention is not present in existing crankcase emission control devices which rely upon the use of precisely formed metering orifices or which have valves which are completely closed at some stage of their operation. Moreover, the valve member is reciprocated into and out of engagement with its seat as the device is operated, thereby causing the valve member to strip from the seat any deposits which may form on the seat, or on the valve member, as a result of the condensation of the emissions.

FIGURE 3 illustrates the structure of a typical carburetor 39. The carburetor includes a housing 60 which defines an air/air-fuel passage 61 connected between the air cleaner and an intake manifold casting 62. A venturi 63 is disposed in passage 61 and has an air-flow duct 64 and a fuel duct 65 which connects duct 64 with the outlet of a fuel float chamber 66. As noted above, the vacuum in the chamber within the intake manifold is relied upon to draw air through the venturi so that fuel is educted through duct 65 to be mixed with the air flowing through venturi duct 64. When the engine is idling or operating at low power, however, throttle valve plate 45 closes or essentially closes passage 61 and the pressure difference across the venturi is not great enough to force fuel through duct 65; the nearly closed throttle plate produces a strong vacuum below the throttle plate.

In order that fuel may be supplied to the engine when the engine is idling, carburetor 39 includes an idle fuel passage 67 which extends from duct 65 adjacent the float chamber to passage 61 below the throttle plate. An idle air bleed hole 68 opens to passage 67 from the portion of passage 61 upstream of the venturi adjacent the venturi air duct. The idle air bleed hole admits air to the fuel flowing past it, and also serves to dissipate any siphoning action at high speeds or when the engine is not operating. As shown most clearly in FIG. 4, the idle fuel passage opens to the air/air-fuel passage via a port 69 below the closed position of the throttle plate, via a port 70 at the closed position of the throttle plate, and via a port 71 above the closed position of the throttle plate. An adjustable idle fuel control needle valve 72 is threaded into the carburetor housing adjacent the throttle plate and has its needle or point cooperating with port 69 to regulate the flow of fuel through this port. Because of the manner in which the idle fuel passage communicates with passage 61, the pressure in the idle fuel passage follows the pressure in passage 61 above the throttle plate. Curve G in FIG. 5 shows the variation in this pressure with intake manifold pressure.

Not all carburetors include a port into the intake manifold passage above the throttle valve, but they do include an idle fuel system like that or equivalent to that described above. If device 10 is to be installed pursuant to system 35 in an automobile which has a carburetor which does not include a port above the throttle valve and by which the spark advance control vacuum signal is obtained, then such a port must be drilled in the carburetor so that the vacuum control signal for device 10 can be obtained. It is often desired that device 10 be added to an existing automobile, but if the mechanic installing the device has to drill a port in the carburetor to which duct 48 may be connected there is a chance that the finished installation may be defective.

FIGURE 4 illustrates the presently preferred manner of obtaining the control vacuum signal for device 10. Idle fuel control needle valve 72 is removed from the carburetor and a needle valve 75 provided with device 10 is inserted in its place. Needle valve 75 has a main barrel 76 which has an externally threaded portion 77 cooperating with the hole provided for valve 72. Barrel 76 also has an unthreaded portion 78 around which the end of duct 48 is secured by a clamp 79. A control needle point 80 extends from the threaded end of the barrel into cooperation with port 69. The barrel of the needle valve defines an axial bore 81 which extends from communication with duct 48 into communication with idle fuel passage 67 via a hole 82 drilled through the valve transversely of the bore at the end of point 80 adjacent barrel 76. This structure provides a mechanism whereby the pressure in the intake manifold anteriorly of the throttle valve is presented to the interior of duct 48, duct 48 also being in communication with the upper side of diaphragm 20 in device 10 via port 23.

From the foregoing description, it will be understood that device 10 is coupled in the preferred manner to the engine intake manifold means by the structure shown in FIG. 4 rather than by the structure illustrated in FIG. 2. As indicated above, the vacuum control signal presented to device 10 is illustrated by curve G of FIGURE 5. When so connected, the gas flow rate through the metering valve is according to curve J. It will be observed that the ordinate of curve J does not fall below the ordinate of curve A until the engine is operated at some point above range 55, and thus the device when coupled as illustrated in FIG. 4 still causes all the blow-by vapors generated within range 55 to be passed through the device. The advantages of system 35 discussed above are obtained when the device is used in its preferred installation shown by FIG. 2 modified by FIG. 4.

It was noted above that chamber part 22 is in communication with passage 16 via apertures 32. Accordingly, diaphragm 20 deflects in response to the differential between the pressure in the intake manifold anteriorly of the throttle valve (obtained either as shown in FIG. 2 or as shown in FIG. 4) and the pressure in the crankcase. If for any reason the pressure in the crankcase should become excessive, the diaphragm will be deflected to open the metering valve in passage 16 and vent this pressure to the intake manifold. As noted above, the pressure in the crankcase normally is near atmospheric pressure; this is the case for the majority of automobiles. Not infrequently, however, the engine with which device 10 is used may be in such condition that superatmospheric pressures are developed in the crankcase. If these superatmospheric pressures are not relieved, they may cause gaskets or seals in and around the crankcase to be blown or otherwise damaged. Device 10, however, assures that superatmospheric pressures in the crankcase will be relieved since when such pressures exist, they are presented to diaphragm 20 and valve 25 is opened so that the pressure is vented to the intake manifold.

The invention has been described above in the context of certain configurations of apparatus merely by way of setting forth presently preferred embodiments of the invention. Those skilled in the art to which this invention relates will understand that this structure may be modified or altered without departing from the intent and spirit of the invention. Therefore the foregoing description is not to be considered to be determinative in fixing the scope of the invention. Rather, the scope of the invention, with equivalents consistent with the foregoing define the scope of the invention.

What is claimed is:

1. A crankcase emission control device for an internal combustion engine having a crankcase and intake manifold means including a throttle valve, said device comprising evacuating conduit means for connecting said crankcase to said intake manifold means posteriorly of said throttle valve, and pressure operated control valve means in said evacuating conduit means controlling the flow of vapor therein from said crankcase to said intake manifold means, said control valve means being movable between a first position defining a discrete vapor flow area in said evacuating conduit means and a second position defining a vapor flow area in said evacuating conduit means greater than the discrete area in response to a predetermined differential between the pressure in said intake manifold means anteriorly of said throttle valve and the pressure in the crankcase.

2. A crankcase emission control device for an internal combustion engine having a crankcase and intake manifold means including a throttle valve, said device comprising evacuating conduit means for connecting said crankcase to said intake manifold means posteriorly of said throttle valve, and pressure operated control valve means in said evacuating conduit means controlling the flow of vapor therein from said crankcase to said intake manifold means, said control valve means being movable between a first position defining a discrete vapor flow area said evacuating conduit means and a second position defining a vapor flow area in said evacuating conduit means greater than the discrete area in response to a predetermined differential pressure in said intake manifold means at and anteriorly of said throttle valve and the pressure in the crankcase.

3. A crankcase emission control device for an internal combustion engine having a crankcase and intake manifold means including a throttle valve, said device comprising evacuating conduit means for connecting said crankcase to said intake manifold means posteriorly of said throttle valve, and pressure operated control valve means in said evacuating conduit means controlling the flow of vapor therein from said crankcase to said intake manifold means, said control valve means including a movable valve member and a valve seat in said evacuating conduit means, the valve member being movable between a first position defining a discrete vapor flow area in said evacuating conduit means between the valve member and the seat and a second position defining a vapor flow area in said evacuating conduit means greater than the discrete area in response to a predetermined differential between the pressure in said intake manifold means anteriorly of said throttle valve and the pressure in the crankcase.

4. A crankcase emission control device for an internal combustion engine having a crankcase and intake manifold means including a throttle valve, said device comprising evacuating conduit means for connecting said crankcase to said intake manifold means posteriorly of said throttle valve, pressure operated control valve means in said evacuating conduit means controlling the flow of vapor therein from said crankcase to said intake manifold means, said control valve means including a movable valve member, a valve seat in said evacuating conduit means, a diaphragm to which the valve member is connected, and means communicating the evacuating conduit means with one side of the diaphragm, and control signal conduit means communicating at one end with the other side of the diaphragm and adapted at its other end to connect to the intake manifold means across the throttle valve, the valve member being movable between a first position defining a discrete vapor flow area in said evacuating conduit means between the valve member and the seat and a second position defining a vapor flow area in said evacuating conduit means greater than the discrete area in response to a predetermined differential between the pressure in said intake manifold means anteriorly of said throttle valve and the pressure in the crankcase.

5. A crankcase emission control device for an internal combustion engine having a crankcase and intake manifold means including a throttle valve, the device comprising a housing having a chamber therein and a passage therethrough, first conduit means connected to one end of the passage for connection to the crankcase, second conduit means connected to the other end of the passage for connection to the intake manifold means posteriorly of the throttle valve, a valve seat defined by the passage, a diaphragm across the chamber, a movable valve member cooperating with the seat and connected to the diaphragm, control duct means communicating with the chamber on one side of the diaphragm and adapted to connect to the intake manifold means anteriorly of the throttle valve, and means presenting the pressure in the crankcase to the chamber on the other side of the diaphragm, the valve member being movable between a first position defining a discrete vapor flow area in the passage between the valve member and the seat and a second position defining a vapor flow area in the passage greater than the discrete area in response to a predetermined differential between the pressure in the intake manifold means anteriorly of the throttle valve and the pressure in the crankcase.

6. Apparatus according to claim 5 wherein the side of the diaphragm to which the pressure in the crankcase is presented is disposed toward the passage, and port means in the housing communicating the passage anteriorly of the seat with the chamber on the side of the diaphragm toward the passage.

7. Apparatus according to claim 5 including a spring in the chamber engaged between said one side of the diaphragm and the housing and exerting a selected biasing force on the diaphragm urging the valve member into the first position thereof.

8. Apparatus according to claim 5 wherein the passage has a first portion to which the first conduit means is connected and a second portion to which the second conduit means is connected, the passage first and second portions being angled relative to each other, the second passage portion adjacent the fisrt passage portion having a cylindrical cross-sectional configuration along at least a portion of its length and defining the seat, the valve member being disposed axially of the seat and having a diameter a selected amount less than the diameter of the cylindrically cross-sectional portion of the second passage portion.

9. Apparatus according to claim 8 wherein the valve member has a tapered end opposite from the diaphragm which is disposed within the cylindrically cross-sectioned portion of the second passage portion when the valve member is in said first position.

10. Apparatus according to claim 9 wherein the intake manifold means includes a carburetor having a housing defining a duct within which the throttle valve is disposed and a fuel float chamber, the carburetor housing also defining an idle fuel passage communicating between the fuel float chamber and the carburetor duct both anteriorly and posteriorly of the throttle valve, the carburetor including an idle adjustment valve extending from the exterior of the carburetor housing to the idle fuel passage and operable for varying the communication between the idle fuel passage and the carburetor duct posteriorly of the throttle valve, the idle adjustment valve having a bore therethrough communicating between the exterior of the carburetor housing and the idle fuel passage, and the second conduit means communicates with the needle valve bore.

11. In combination with an internal combustion engine having a crankcase, a carburetor defining an air/fuel mixture duct having a throttle valve therein and an idle fuel passage communicating with the air/fuel mixture duct anteriorly and posteriorly of the throttle valve, and an intake manifold, a crankcase emission control device comprising a housing having a chamber therein and a passage therethrough, first conduit means connected between one end of the passage and the crankcase, second conduit means connected between the other end of the passage and the intake manifold means posteriorly of the throttle valve, a valve seat defined by the passage, diaphragm means disposed in the chamber to divide the chamber into a first and a second portion, a movable valve member cooperating with the seat and connected to the diaphragm means, control duct means communicating with the first portion of the chamber and the carburetor idle fuel passage and means presenting the pressure in the crankcase to the second portion of chamber, the valve member being movable between a first position defining a discrete vapor flow area in the passage between the valve member and the seat and a second position defining a vapor flow area in the passage greater than the discrete area in response to a predetermined differential between the pressure in the idle fuel passage and the pressure in the crankcase.

12. A crankcase emission control system for an automobile or the like including an internal combustion engine having a crankcase, a carburetor including a throttle valve, an intake manifold connected between the carburetor and the engine, an air cleaner discharging clean air to the carburetor, an oil filler duct into the crankcase and a cap therefor, and a crankcase air vent, the system comprising a crankcase emission flow control device having a housing defining therein a chamber and a passage through the housing independent of the chamber, the passage having an inlet communicating with the crankcase via the oil filler cap and an outlet communicating with the intake manifold, the passage between the inlet and the outlet defining a cylindrical valve seat, a diaphragm across the chamber, a valve member connected to the diaphragm for reciprocation in response to deflection of the diaphragm and having a cylindrical metering and control portion of diameter a predetermined amount less than the diameter of the valve seat disposed in and axially aligned with the valve seat, the valve member metering and control portion terminating in a conically tapered point, means communicating the passage anteriorly of the seat with one side of the diaphragm, a control vacuum duct communicating between the other side of the diaphragm and the air flow path through the carburetor between the air cleaner and the throttle valve, and a duct communicating between the crankcase air vent and the air cleaner, the crankcase being sealed except for the connections thereto via the oil filler cap and the air vent, the metering valve member being movable in response to deflection of the diaphragm between a first position relative to the seat wherein the base of the conical point thereof is disposed within the cylindrical valve seat and a second position wherein the base of the conical point is removed from the seat, the diaphragm deflecting in response to variations in the difference between the pressures in the crankcase and in the carburetor between the air cleaner and the throttle valve.

13. A crankcase emission control system for an automobile or the like including an internal combustion engine having a crankcase, a carburetor defining an air flow path and including a throttle valve disposed below a venturi for mixing fuel and air, the carburetor also defining an idle fuel passage communicating with the air flow path both across the throttle valve and upstream of the venturi, an intake manifold connected between the carburetor and the engine, an air cleaner discharging clean air to the carburetor, an oil filler duct into the crankcase and a cap therefor, and a crankcase air vent, the system comprising a crankcase emission flow control device having a housing defining therein a chamber and a passage through the housing independent of the chamber, the passage having an inlet communicating with the crankcase via the oil filler cap and an outlet communicating with the intake manifold, the passage between the inlet and the outlet defining a cylindrical valve seat, a diaphragm across the chamber, a valve member connected to the diaphragm for reciprocation in response to deflection of the diaphragm and having a cylindrical metering and control portion of diameter a predetermined amount less than the diameter of the valve seat disposed in and axially aligned with the valve seat, the valve member metering and control portion terminating in a conically tapered point, means communicating the passage anteriorly of the seat with one side of the diaphragm, a control vacuum duct communicating between the other side of the diaphragm and the idle fuel passage adjacent the throttle valve, and a duct communicating between the crankcase air vent and the air cleaner, the crankcase being sealed except for the connections thereto via the oil filler cap and the air vent, the metering valve member being movable in response to deflection of the diaphragm between a first position relative to the seat wherein the base of the conical point thereof is disposed within the cylindrical valve seat and a second position wherein the base of the conical point is removed from the seat, the diaphragm deflecting in response to variations in the difference between the pressures in the crankcase and in the carburetor between the air cleaner and the throttle valve.

References Cited by the Examiner

UNITED STATES PATENTS

| | | | |
|---|---|---|---|
| 2,359,485 | 10/1944 | Lowther | 123—119 |
| 3,092,091 | 6/1963 | Bosley | 123—119 |
| 3,144,044 | 8/1964 | Anthes | 123—119 |

JULIUS E. WEST, *Primary Examiner.*